United States Patent
Kleila

(10) Patent No.: US 8,777,810 B2
(45) Date of Patent: Jul. 15, 2014

(54) METHOD FOR CONTROLLING AN AUTOMATIC TRANSMISSION OF A MOTOR VEHICLE AFTER A COLD START AND TRANSMISSION SYSTEM

(75) Inventor: Hans Kleila, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 483 days.

(21) Appl. No.: 13/026,748

(22) Filed: Feb. 14, 2011

(65) Prior Publication Data

US 2011/0201475 A1 Aug. 18, 2011

(30) Foreign Application Priority Data

Feb. 15, 2010 (DE) .......................... 10 2010 007 987

(51) Int. Cl.
*F16H 59/78* (2006.01)
*B60W 10/06* (2006.01)
*B60W 10/10* (2012.01)

(52) U.S. Cl.
USPC ........................................... 477/98; 477/115

(58) Field of Classification Search
CPC ....... F16H 59/78; B60W 10/06; B60W 10/11; B60W 2510/0604
USPC ................................................... 477/98, 115
See application file for complete search history.

(56) References Cited

U.S. PATENT DOCUMENTS

| 4,817,473 A | * | 4/1989 | Baltusis et al. ................ 477/65 |
| 2007/0004555 A1 | * | 1/2007 | Berger .......................... 477/115 |
| 2008/0004159 A1 | * | 1/2008 | Kubonoya et al. ............. 477/115 |

FOREIGN PATENT DOCUMENTS

| DE | 4438914 A1 | 5/1996 |
| WO | 2008130290 A1 | 10/2008 |
| WO | 2009040625 A1 | 4/2009 |

* cited by examiner

*Primary Examiner* — Edwin A Young
(74) *Attorney, Agent, or Firm* — Ingrassia Fisher & Lorenz, P.C.

(57) ABSTRACT

A method is provided for controlling an automatic transmission of a motor vehicle, in which the engine speed is limited after a cold start and a normal shift point is used for shifting to the next higher gear of the automatic transmission in the case of an average operating temperature of an engine, before the average operating temperature is reached, a cold shift point being used for shifting to the next higher gear of the automatic transmission, in the case of which upshifting is performed at a lower vehicle velocity than in the case of the normal shift point. Upshifting into the next higher gear of the automatic transmission can be made easier, since upshifting can already be performed at lower vehicle velocities and therefore lower engine speeds in the cold start phase.

22 Claims, 3 Drawing Sheets

METHOD FOR CONTROLLING AN AUTOMATIC TRANSMISSION OF A MOTOR VEHICLE AFTER A COLD START AND TRANSMISSION SYSTEM

CROSS-REFERENCE TO RELATED APPLICATION

This application claims priority to German Patent Application No. 102010007987.1, filed Feb. 15, 2010, which is incorporated herein by reference in its entirety.

TECHNICAL FIELD

The technical field relates to a method and a transmission system of a motor vehicle, with the aid of which an automatic transmission of a motor vehicle is controlled after a cold start.

BACKGROUND

Controlling the engine torque of a motor vehicle after a cold start to prevent negative influences on the engine during the cold start phase is known. It is disadvantageous that difficulties sometimes occur during the cold start phase when shifting into the next higher gear.

It is therefore at least one object to provide a method for controlling an automatic transmission of a motor vehicle and a transmission system for a motor vehicle, with the aid of which difficulties of the automatic transmission in performing an upshift during the cold start phase may be reduced. In addition, other objects, desirable features and characteristics will become apparent from the subsequent summary and detailed description, and the appended claims, taken in conjunction with the accompanying drawings and this background.

SUMMARY

In the method for controlling an automatic transmission of a motor vehicle, after a cold start, the engine torque is limited and, in the case of an average operating temperature of an engine, a normal shift point is used for shifting to the next higher gear of the automatic transmission. Before the average operating temperature is reached, a cold shift point is used for shifting the next higher gear of the automatic transmission. In the case of the cold shift point, upshifting is performed at a lower vehicle velocity than in the case of the normal shift point.

An upshift into the next higher gear of a automatic transmission can be made easier, since an upshift can already be performed in the cold start phase at lower vehicle velocities and thus lower engine speeds. An upshift can thus be performed during the cold start phase even in the event of increased load, for example, during hill climbing when the accelerator pedal is pressed far down, so that the risk of not reaching the required vehicle velocity or the required engine speed for upshifting is reduced. Difficulties of the automatic transmission in being able to perform an upshift during the cold start phase can thus be reduced. Because a cold shift point can be used instead of the typical normal shift point during the cold start phase, upshifting can already be performed at lower vehicle velocities. The cold start phase is the time span in which the coolant water temperature after a cold start has not yet reached an average operating temperature. The average operating temperature is reached at a temperature at which the coolant water temperature no longer substantially changes during correct use of the motor vehicle. Such an average operating temperature can be approximately 80° C. to approximately 90° C., for example. Furthermore, more harmonic and more thrifty driving behavior can result during the cold start phase, since driving can be performed at lower engine speeds due to the earlier upshift. Simultaneously, cold and viscous oil can be prevented from being suctioned ("blow by") into the combustion chamber by the valve drive of the motor vehicle engine.

The vehicle velocity at which upshifting is performed in the case of the cold shift point is preferably varied as a function of a position of an accelerator pedal. The position of the accelerator pedal in a motor vehicle having an automatic transmission is an indicator of the desired driving behavior of the motor vehicle. For example, if the driver presses the accelerator pedal down completely, he typically wishes to shift down a gear for a strong acceleration and therefore to perform a so-called kick down. If a driver reduces the accelerator pedal position during travel, in contrast, this can be a sign that he wishes to drive in a more thrifty manner and therefore a shift into the next higher gear is to be performed. Because the cold shift point can also be varied as a function of the accelerator pedal position, the shift behavior of the automatic transmission can also be adapted to the requirements of the driver at lower engine speeds, without excessively stressing the motor vehicle engine in the cold start phase.

The vehicle velocity at which upshifting is performed in the case of the cold shift point is particularly preferably varied as a function of the coolant water temperature. The vehicle velocity at which upshifting is performed in the case of the cold shift point is particularly reduced in relation to the normal shift point at a coolant water temperature of—approximately 32° C. to approximately −8° C. by approximately 38% to approximately 42%, at a coolant water temperature of approximately −7° C. to approximately −3° C. by approximately 35% to approximately 38%, at a coolant water temperature of approximately −2° C. to approximately 2° C. by approximately 31% to approximately 35%, and at a coolant water temperature of greater than approximately 8° C. by approximately 0% to approximately 31%. Because the vehicle velocity at which the cold shift point is reduced is a function of the coolant water temperature, in the case of rising coolant water temperature, the normal operation of the motor vehicle can be approached step-by-step, so that the restriction of the engine power during the cold start phase may be reduced more rapidly. The selection of the coolant water temperature is favorable in that it corresponds sufficiently precisely to the engine temperature.

The limiting of the engine speed and/or the engine torque is particularly preferably performed as a function of the coolant water temperature. The limited engine speed is limited at the coolant water temperature of approximately −32° C. to approximately −8° C. by approximately 38% to approximately 42%, at coolant water temperature of approximately −7° C. to approximately −3° C. by approximately 35% to approximately 38%, at the coolant water temperature of approximately −2° C. by approximately 2° C. to approximately 31% to approximately 35%, and at a coolant water temperature of greater than approximately 8° C. to approximately 12° C. by approximately 0% to approximately 31% of a maximum rated engine speed of the engine. Because the limiting of the engine speed and/or the engine torque can also be coupled to the coolant water temperature, the engine speed and/or the engine torque can be individually adapted to a vehicle velocity, which is variable in particular, for upshifting at the cold shift point. Unnecessary restrictions of the driving properties of the motor vehicle can thus be avoided. Furthermore, the maximum power of the engine can be dynamically adapted to the engine temperature modeled by the coolant water temperature, in order to prevent excessively high power during the cold start phase. This protects the engine and reduces the danger of engine damage.

The cold shift point is preferably used in a motor vehicle having a diesel engine. Cold and viscous oil can thus be prevented from being suctioned into a combustion chamber in diesel engines after a cold start. The risk of engine damage is thus reduced. Shift characteristic curves for establishing the vehicle velocities at which upshifting is performed in the case of the cold shift point as a function of a position of an accelerator pedal ("cold shift characteristic curves") are preferably stored in an electronic control unit. Various shift points may be uniquely established as a function of the position of the accelerator pedal by storing characteristic curves.

Different shift characteristic curves for establishing the vehicle velocities at which upshifting is performed at the cold shift point ("cold shift characteristic curves") are particularly preferably stored and used for different gears of the automatic transmission and/or different coolant water temperatures. Different cold shift characteristic curves may thus be used for various gears.

A transmission system for a motor vehicle is also provided that comprises an automatic transmission for the transmission of an engine speed and a coolant water temperature sensor for measuring a coolant water temperature of an engine. A control unit is provided for the variation of a vehicle velocity, at which a shift is performed into a next higher gear of the automatic transmission, as a function of the coolant water temperature. Upshifting into the next higher gear of an automatic transmission can be made easier, since upshifting can already be performed in the cold start phase at lower vehicle velocities and therefore lower engine speeds. An upshift can also be performed during the cold start phase in the case of increased load, for example, when traveling uphill with the accelerator pedal pressed far down, so that the risk of not reaching the required vehicle velocity or the required engine speed for upshifting is reduced. Difficulties of the automatic transmission in being able to perform an upshift during the cold start phase may thus be reduced. In particular, the vehicle velocities at which upshifting is performed in the case of a cold shift point are established in cold shift characteristic curves and stored in the control unit. Various shift points may be uniquely established as a function of the position of the accelerator pedal by storing shift characteristic curves.

Different cold shift characteristic curves are particularly preferably stored in the control unit for different gears of the automatic transmission and/or different coolant water temperatures to establish the vehicle velocities at which upshifting is performed in the case of a cold shift point. Different cold shift characteristic curves may thus be used for various gears.

Furthermore, a drivetrain for a motor vehicle is provided that comprises an engine for providing an engine speed and a transmission system connected to the engine, which can be implemented and refined as described above. An upshift into the next higher gear of the automatic transmission can be made easier, since upshifting can already be performed in the cold start phase at lower vehicle velocities and therefore lower engine speeds. Difficulties of the automatic transmission in performing an upshift during the cold start phase may thus be reduced.

The engine is preferably designed as a diesel engine. The risk that the sometimes occurring blow-by effect, in which cold, viscous oil is suctioned by a valve drive into a combustion chamber and engine damage thus occurs after a cold start, can therefore be reduced in diesel engines.

A computer program product having program code is also provided which is stored on a computer-readable data carrier, in order to perform the above-described method when the program product is executed on a computer, in particular a control unit of a transmission system and/or a drivetrain. The transmission system and/or the drivetrain may be implemented and refined as described above. With the aid of the computer program, a control unit for a transmission system and/or a drivetrain of a motor vehicle can particularly be made capable of making an upshift into the next higher gear of the automatic transmission easier, since upshifting can already be performed at lower vehicle velocities and therefore lower engine speeds in the case of the cold start phase. Difficulties of the automatic transmission in being able to perform an upshift during the cold start phase may thus be reduced.

Furthermore, a computer program is provided having coded instructions for performing the above-described method when the computer program is executed on a computer, in particular a control unit of an above-described transmission system and/or an above-described drivetrain. With the aid of the computer program, a control unit for a transmission system and/or a drivetrain of a motor vehicle can particularly be made capable of making upshifting into the next higher gear step of the automatic transmission easier, since upshifting can already be performed in the cold start phase at lower vehicle velocities and therefore lower engine speeds. Difficulties of the automatic transmission in being able to perform an upshift during the cold start phase may thus be reduced. The computer program can particularly be stored on the above-described computer program product, for example, a diskette, CD-ROM, DVD, or a memory of a computer unit connected to the Internet. The computer program can particularly be designed as a compiled or uncompiled data sequence, which is preferably based on a higher, in particular object-based computer language, such as C, C++, Java, Smalltalk, Pascal, or Turbo Pascal.

A signal sequence is also provided having computer-readable instructions for performing the above-described method when the signal sequence is processed on a computer, in particular a control unit of an above-described transmission system and/or an above-described drivetrain. With the aid of the signal sequence, in particular a control unit for a transmission system and/or a drivetrain of a motor vehicle can be made capable of making an upshift into the next higher gear of the automatic transmission easier, since upshifting can already be performed in the cold start phase at lower vehicle velocities and therefore lower engine speeds. Difficulties of the automatic transmission in being able to perform an upshift during the cold start phase may thus be reduced. The signal sequence can particularly be created with the aid of the above-described computer program and/or with the aid of the above-described computer program product. The signal sequence can be provided in a wireless or wire-bound manner as electrical pulses and/or electromagnetic waves and/or optical pulses.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
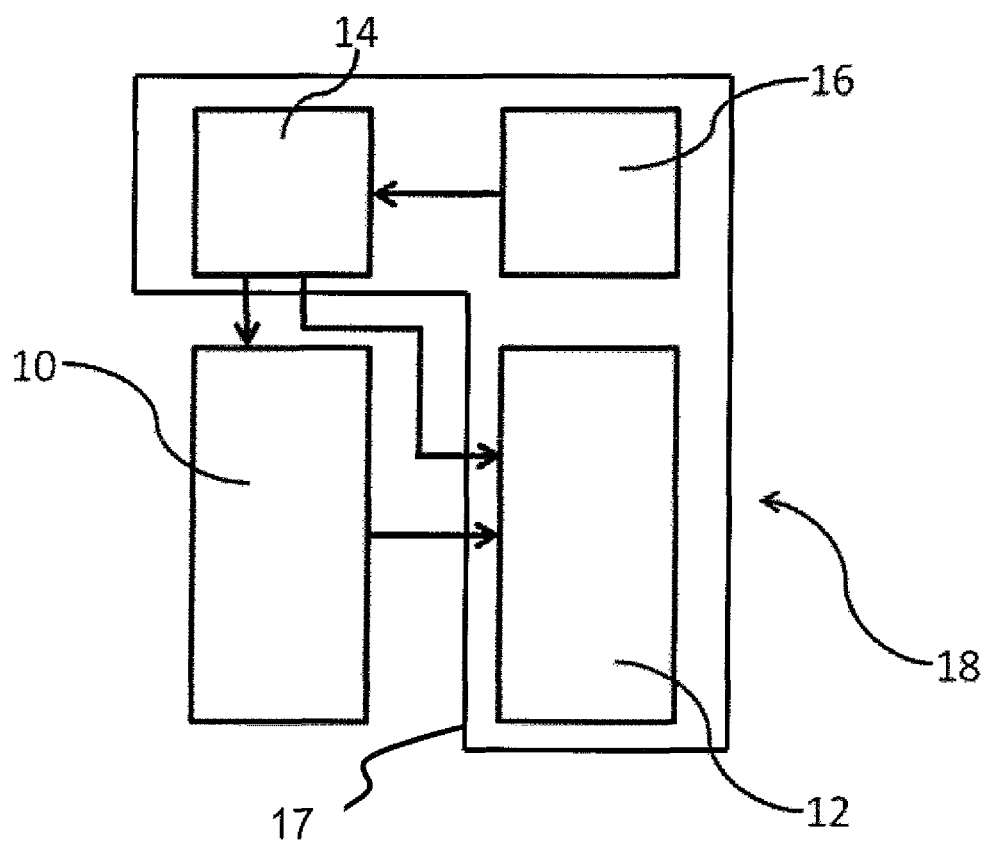
FIG. 1 shows a schematic view of the drivetrain according to an embodiment.

The drivetrain 18 of a motor vehicle shown in FIG. 1 has an engine 10, which is connected to a transmission system 17, and which provides an engine speed 22, which is transmitted by an automatic transmission 12 of the motor vehicle using different gears. A control unit 14 limits the engine speed 22 as a function of the coolant water temperature measured by a temperature sensor 16. Furthermore, the control unit 14 sets a reduced vehicle velocity, at which upshifting into a next higher gear of the automatic transmission 12 is performed during the cold start phase.

Figure 2:
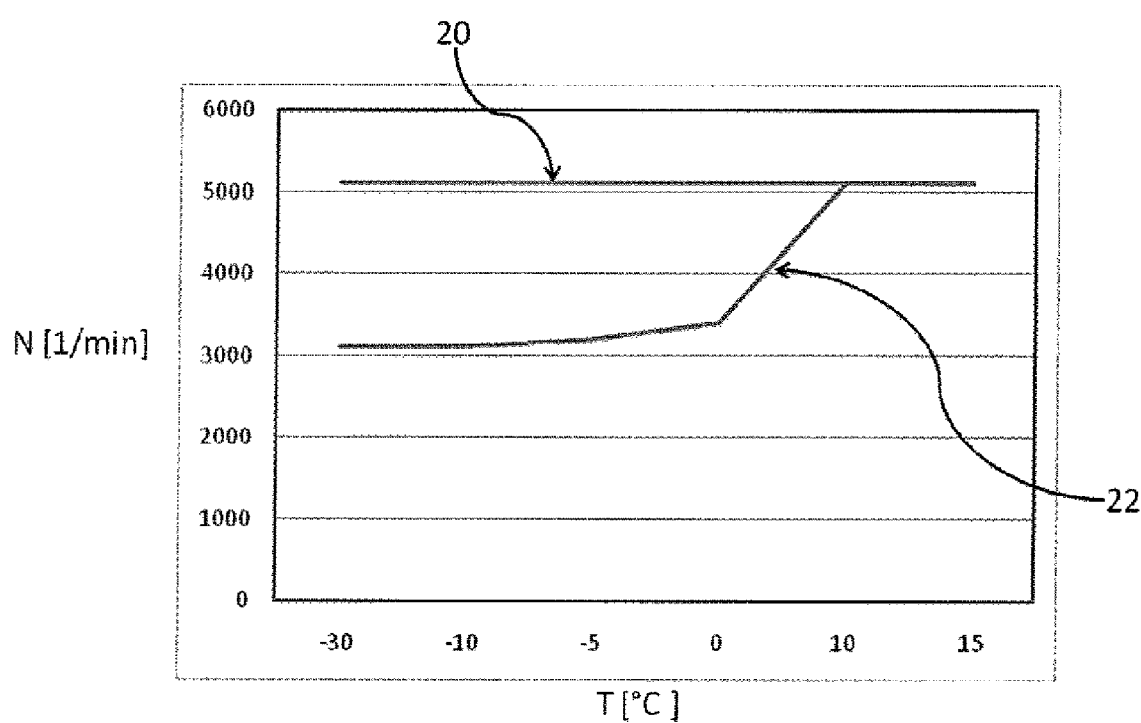
FIG. 2 shows a graph of an embodiment of the limiting of the engine speed according to an embodiment after a cold start.

The graph in FIG. 2 shows an exemplary embodiment of the extent to which the engine speed 22 can be limited in relation to the maximum rated engine speed 20. In the exemplary embodiment, the engine speed 22 is limited in a coolant water temperature range of approximately −30° C. to approximately 10° C. From a coolant water temperature T of greater than approximately 10° C., the engine speed 22 is no longer limited and the maximum rated engine speed is available.

Figure 3:
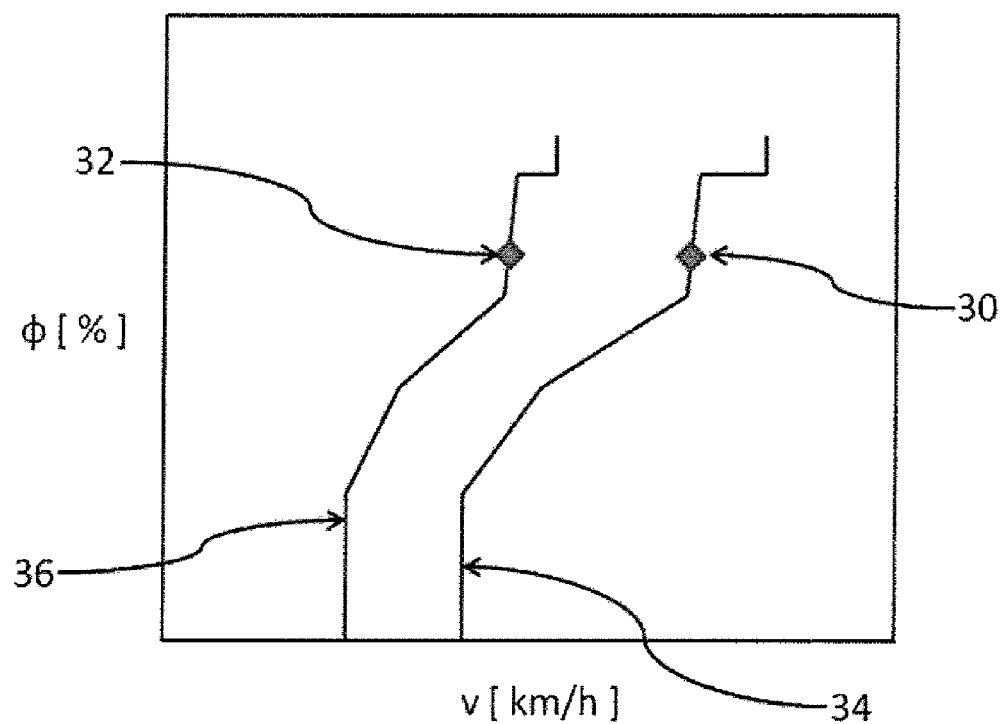
FIG. 3 shows a graph having shift characteristic curves of a normal shift point and a cold shift point.

The graph in FIG. 3 shows an exemplary embodiment of a curve of a vehicle velocity v, in normal operation, an upshift occurring along a normal shift characteristic curve 34 in normal operation and along a cold shift characteristic curve 36 during the cold start phase. In the case of a rising engine temperature, which can be measured via the coolant water temperature, the cold shift characteristic curve 36 can dynamically travel toward higher vehicle velocities v until the cold shift characteristic curve 36 coextends with the normal shift characteristic curve 34. The cold shift characteristic curve 36 can be varied for other coolant water temperatures and gears of the automatic transmission 12. As a result, upshifting is performed at the lower vehicle velocity v in the case of a cold shift point 32 in relation to a normal shift point 30, the shift points 30 and 32 corresponding to a position of the accelerator pedal of Φ approximately equal to 65%. At an accelerator pedal position of Φ approximately equal 100% the accelerator pedal is pressed down completely, while at an accelerator pedal position of Φ approximately equal to 0%, the accelerator pedal is not operated at all.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling an automatic transmission of a motor vehicle, comprising:
    initiating a cold start of an engine;
    limiting a parameter of the engine after the cold start;
    selecting a normal shift point shifting to a next higher gear of the automatic transmission when in an average operating temperature of the engine; and
    selecting a cold shift point for shifting to the next higher gear of the automatic transmission before reaching the average operating temperature of the engine when an upshifting is performed at a first vehicle velocity that is lower than a second vehicle velocity of a normal shift point.

2. The method according to claim 1, further comprising varying the first vehicle velocity as a function of a position of an accelerator pedal.

3. The method according to claim 1, further comprising varying the first vehicle velocity as a function of a coolant water temperature.

4. The method according to claim 1, further comprising reducing the first vehicle velocity in relation to the normal shift point by approximately 38% to approximately 42% at a coolant water temperature of approximately −32° C. to approximately −8° C.

5. The method according to claim 1, further comprising reducing the first vehicle velocity in relation to the normal shift point by approximately 35% to approximately 38% at a coolant water temperature of approximately −7° C. to approximately −3° C.

6. The method according to claim 1, further comprising reducing the first vehicle velocity in relation to the normal shift point by approximately 31% to approximately 35% at a coolant water temperature of approximately −2° C. to approximately 2° C.

7. The method according to claim 1, further comprising reducing the first vehicle velocity in relation to the normal shift point by approximately 0% to approximately 31% at a coolant water temperature of greater than approximately 8° C. to approximately 12° C.

8. The method according to claim 1, wherein the parameter is an engine speed limited by approximately 38% to approximately 42% at a coolant water temperature of approximately −32° C. to approximately −8° C.

9. The method according to claim 1, wherein the parameter is an engine speed limited by approximately 35% to 38% at a coolant water temperature of approximately −7° C. to approximately −3° C.

10. The method according to claim 1, wherein the parameter is an engine speed limited by approximately 31% to approximately 35% at a coolant water temperature of approximately −2° C. to approximately 2° C.

11. The method according to claim 1, wherein the parameter is an engine speed limited by approximately 0% to approximately 31% of a maximum rated engine speed of the engine at a coolant water temperature of greater than approximately 80° C.

12. The method according to claim 1, wherein the parameter is an engine torque.

13. The method according to claim 1, wherein the engine is a diesel engine.

14. A transmission system for a motor vehicle, comprising:
    an automatic transmission;
    a coolant water temperature sensor configured to measure an engine coolant water temperature; and
    a control unit configured to control the automatic transmission and receive the engine coolant water temperature, the control unit configured to vary a vehicle velocity at which a shift is performed into a next higher gear of the automatic transmission as a function of the engine coolant water temperature.

15. The transmission system according to claim 14, wherein vehicle velocities at which upshifting is performed when at a cold shift point are established in cold shift characteristic curves accessible by the control unit.

16. The transmission system according to claim 15, wherein different cold shift characteristic curves are established for different gears of the automatic transmission.

17. The transmission system according to claim 15, wherein different cold shift characteristic curves are established for different coolant water temperatures.

18. A drivetrain for a motor vehicle, comprising:
an engine having an engine speed; and
a transmission system connected to the engine, the transmission system comprising:
an automatic transmission;
a coolant water temperature sensor configured to measure an engine coolant water temperature; and
a control unit configured to control the automatic transmission and receive the engine coolant water temperature, the control unit configured to vary a vehicle velocity at which a shift is performed into a next higher gear of the automatic transmission as a function of the engine coolant water temperature.

19. The drivetrain according to claim 18, wherein the engine is a diesel engine.

20. The drivetrain according to claim 18, wherein vehicle velocities at which upshifting is performed when at a cold shift point are established in cold shift characteristic curves accessible by the control unit.

21. The drivetrain according to claim 18, wherein different cold shift characteristic curves are established for different gears of the automatic transmission.

22. The drivetrain according to claim 18, wherein different cold shift characteristic curves are established for different coolant water temperatures.

* * * * *